(12) United States Patent
Kawazoe et al.

(10) Patent No.: US 10,027,743 B2
(45) Date of Patent: Jul. 17, 2018

(54) CONNECTION CONTROL DEVICE, CONNECTION CONTROL SYSTEM, AND NON-TRANSITORY COMPUTER READABLE MEDIUM

(71) Applicant: KABUSHIKI KAISHA TOSHIBA, Tokyo (JP)

(72) Inventors: Hiroshi Kawazoe, Kanagawa (JP); Daisuke Ajitomi, Tokyo (JP); Keisuke Minami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 14/938,420

(22) Filed: Nov. 11, 2015

(65) Prior Publication Data
US 2016/0142477 A1 May 19, 2016

(30) Foreign Application Priority Data
Nov. 13, 2014 (JP) .................................. 2014-230996

(51) Int. Cl.
*G06F 15/16* (2006.01)
*H04L 29/08* (2006.01)

(52) U.S. Cl.
CPC ................................ *H04L 67/1025* (2013.01)

(58) Field of Classification Search
CPC .................................................. H04L 67/1025
See application file for complete search history.

(56) References Cited

U.S. PATENT DOCUMENTS 5,550,735 A * 8/1996 Slade ..................... G06Q 10/10
360/55
5,915,008 A * 6/1999 Dulman .............. H04L 63/0281
370/352
(Continued)

FOREIGN PATENT DOCUMENTS

JP 2005-321876 11/2005
JP 2008-293511 12/2008
(Continued)

OTHER PUBLICATIONS

I. Fette and A. Melnikov, "The Websocket Protocol", *IETF*, Dec. 2011, 71 pages.

*Primary Examiner* — Moustafa M Meky
*Assistant Examiner* — Andrea Hurst
(74) *Attorney, Agent, or Firm* — Nixon & Vanderhye, P.C.

(57) ABSTRACT

According to one embodiment, a connection control device includes a request acceptor to accept a connection destination determination request transmitted from a first communication device; and a determiner to determine a server being a connection destination of the first communication device from among a plurality of servers. At least one first server among the servers is scheduled to stop running at a first time point. The determiner determines the connection destination of the first communication device in accordance with a number of communication devices connected to each of the servers, based on history information on connection durations by the first communication device with the servers or history information on connection durations by communication devices with the first server, so that a number of the communication devices connected to the first server before the first time point arrives is suppressed.

14 Claims, 12 Drawing Sheets

(56) References Cited

U.S. PATENT DOCUMENTS

| | | | | |
|---|---|---|---|---|
| 5,973,696 A * | 10/1999 | Agranat | ............. | G06F 8/34 707/E17.118 |
| 6,170,018 B1 * | 1/2001 | Voll | ............. | G06F 9/547 707/999.008 |
| 6,456,308 B1 * | 9/2002 | Agranat | ............. | G06F 8/20 707/E17.118 |
| 7,689,697 B2 | 3/2010 | Chiba | | |
| 8,621,475 B2 * | 12/2013 | Matsa | ............. | G06F 9/4881 718/103 |
| 2004/0171383 A1 * | 9/2004 | Fingerhut | ............. | H04W 8/26 455/435.1 |
| 2004/0193676 A1 * | 9/2004 | Marks | ............. | G06F 17/30876 709/203 |
| 2005/0267617 A1 * | 12/2005 | Chao | ............. | G05B 19/4184 700/100 |
| 2007/0174445 A1 * | 7/2007 | Kim | ............. | G06F 8/61 709/223 |
| 2007/0174446 A1 * | 7/2007 | Kim | ............. | H04L 41/0233 709/223 |
| 2008/0201462 A1 * | 8/2008 | Liss | ............. | H04L 41/00 709/223 |
| 2008/0201542 A1 * | 8/2008 | Maruyama | ............. | G06F 3/0607 711/165 |
| 2009/0327854 A1 * | 12/2009 | Chhajer | ............. | G06F 17/30306 715/227 |
| 2010/0042720 A1 * | 2/2010 | Stienhans | ............. | G06F 9/5072 709/226 |
| 2010/0318663 A1 * | 12/2010 | Esteve Balducci | ... | H04W 99/00 709/227 |
| 2011/0314076 A1 * | 12/2011 | Fujiwaka | ............. | G06F 11/2028 709/201 |
| 2012/0311117 A1 * | 12/2012 | Fulop | ............. | G06F 9/45558 709/223 |
| 2013/0086236 A1 * | 4/2013 | Baucke | ............. | H04L 45/50 709/223 |
| 2013/0346232 A1 * | 12/2013 | Ellison | ............. | G06Q 30/0631 705/26.7 |
| 2014/0040704 A1 * | 2/2014 | Wu | ............. | G06F 11/1068 714/773 |
| 2015/0256622 A1 | 9/2015 | Kawazoe et al. | | |

FOREIGN PATENT DOCUMENTS

| | | |
|---|---|---|
| JP | 2012-080179 | 4/2012 |
| JP | 2015-170286 | 9/2015 |

* cited by examiner

| ITEM | VALUE |
|---|---|
| CPU USAGE | 25% |
| AVAILABLE MEMORY | 2GB |
| NUMBER OF WEBSOCKET CONNECTIONS | 10000 |
| NEXT SCHEDULED STOP TIME POINT | 2014/01/15 01:00:00 |
| NEXT SCHEDULED START TIME POINT | 2014/01/15 09:00:00 |

FIG.3

| ITEM/SERVER ID | 01 | 02 |
|---|---|---|
| IP ADDRESS | 192.168.0.1 | 192.168.0.2 |
| CPU USAGE | 25% | 10% |
| AVAILABLE MEMORY | 2GB | 3GB |
| NUMBER OF WEBSOCKET CONNECTIONS | 10000 | 5000 |
| NEXT SCHEDULED STOP TIME POINT | — | 2014/01/15 01:00:00 |
| NEXT SCHEDULED START TIME POINT | — | 2014/01/15 09:00:00 |

FIG.4

| TERMINAL ID (CONTROLLED TERMINAL) | HISTORY OF CONNECTION DURATIONS (MIN) |
|---|---|
| 002 | 20, 50, 10, 30, 40 |
| 004 | 100, 60, 80, 40, 20 |

FIG.5

| SERVER ID | TIME PERIOD | CONNECTION OCCURRENCE FREQUENCY | AVERAGE CONNECTION DURATION |
|---|---|---|---|
| 01 | DAYTIME PERIOD (8:00~24:00) | 12.0 | 120 |
| 01 | NIGHTTIME PERIOD (0:00~8:00) | 7.5 | 60 |
| 01 | ALL DAY PERIOD (0:00~24:00) | 10.5 | 106 |
| 02 | DAYTIME PERIOD (8:00~24:00) | 10.0 | 120 |
| 02 | NIGHTTIME PERIOD (0:00~8:00) | 6.0 | 60 |

FIG.6

CONNECTION CONTROL DEVICE, CONNECTION CONTROL SYSTEM, AND NON-TRANSITORY COMPUTER READABLE MEDIUM

CROSS-REFERENCE TO RELATED APPLICATIONS

This application is based upon and claims the benefit of priority from Japanese Patent Application No. 2014-230996, filed Nov. 13, 2014; the entire contents of which are incorporated herein by reference.

FIELD

Embodiments described herein relate to a connection control device, a connection control system, and a non-transitory computer readable medium.

BACKGROUND

In recent years, there have been increasing demands for remote control of home appliances such as televisions and illumination and other client terminals from a client terminal such as a smartphone and a notebook PC. However, it is often the case that client terminals cannot directly communicate with each other, such as the case where a connection from a different communication network is restricted. For such a case, one method of achieving two-way communication between client terminals is to use a server supporting WebSocket, which is one of communications protocols, as a relay server.

Meanwhile, recent years have seen widespread use of cloud computing services, which provide services over the Internet. One of the cloud computing services is IaaS (Infrastructure as a Service). The IaaS is a service that creates a virtual server or the like (instance) using a virtualization technology and provides it as an infrastructure resource constituting a system. Web service providers or the like using the IaaS can flexibly perform an operation such as adding a virtual server in accordance with the load status of a Web server to expand (scale out) a system. In addition, in the case where the number of connections differs between a daytime period and a nighttime period, such an operation can be performed that scales out a system in the daytime period when there are a large number of connections and returns the system to the original state in the nighttime period. The Web service provider can thereby reduce unnecessary instance usage charges in a time period during which the number of connections decreases, while dealing with the fluctuations of the number of connections.

Now, it is known that, also with respect to connections for the above-described remote control, the number of connections differs between a daytime period and a nighttime period. Therefore, there is a great advantage of constructing a WebSocket server used as a relay server using the IaaS. However, a virtual server must stop after a usage time elapses regardless of the presence/absence of connection. If connections are forcibly disconnected, many of users the connections of which are disconnected immediately try to reconnect to a service, and thus a large number of connecting requests are concentrated to the remaining servers. This causes the loads on the server to temporarily rise suddenly, which is problematic.

BRIEF DESCRIPTION OF THE DRAWINGS

FIG. 3 is a diagram showing an example of state information acquired by a state acquirer in the present embodiment;

FIG. 4 is a diagram showing an example of state information stored in a state storage in the present embodiment;

FIG. 5 is a diagram showing an example of connection time period histories for each controlled terminal, in the present embodiment;

FIG. 6 is a diagram showing an example of connection statistical information for each server, in the present embodiment;

DETAILED DESCRIPTION

According to one embodiment, a connection control device includes a request acceptor to accept a connection destination determination request transmitted from a first communication device; and a determiner to determine a server being a connection destination of the first communication device from among a plurality of servers. At least one first server among the servers is scheduled to stop running at a first time point. The determiner determines the connection destination of the first communication device in accordance with a number of communication devices connected to each of the servers, based on history information on connection durations by the first communication device with the servers or history information on connection durations by communication devices with the first server, so that a number of the communication devices connected to the first server before the first time point arrives is suppressed.

Below, embodiments will be described with reference to the accompanying drawings.

(Embodiment)

Figure 1:
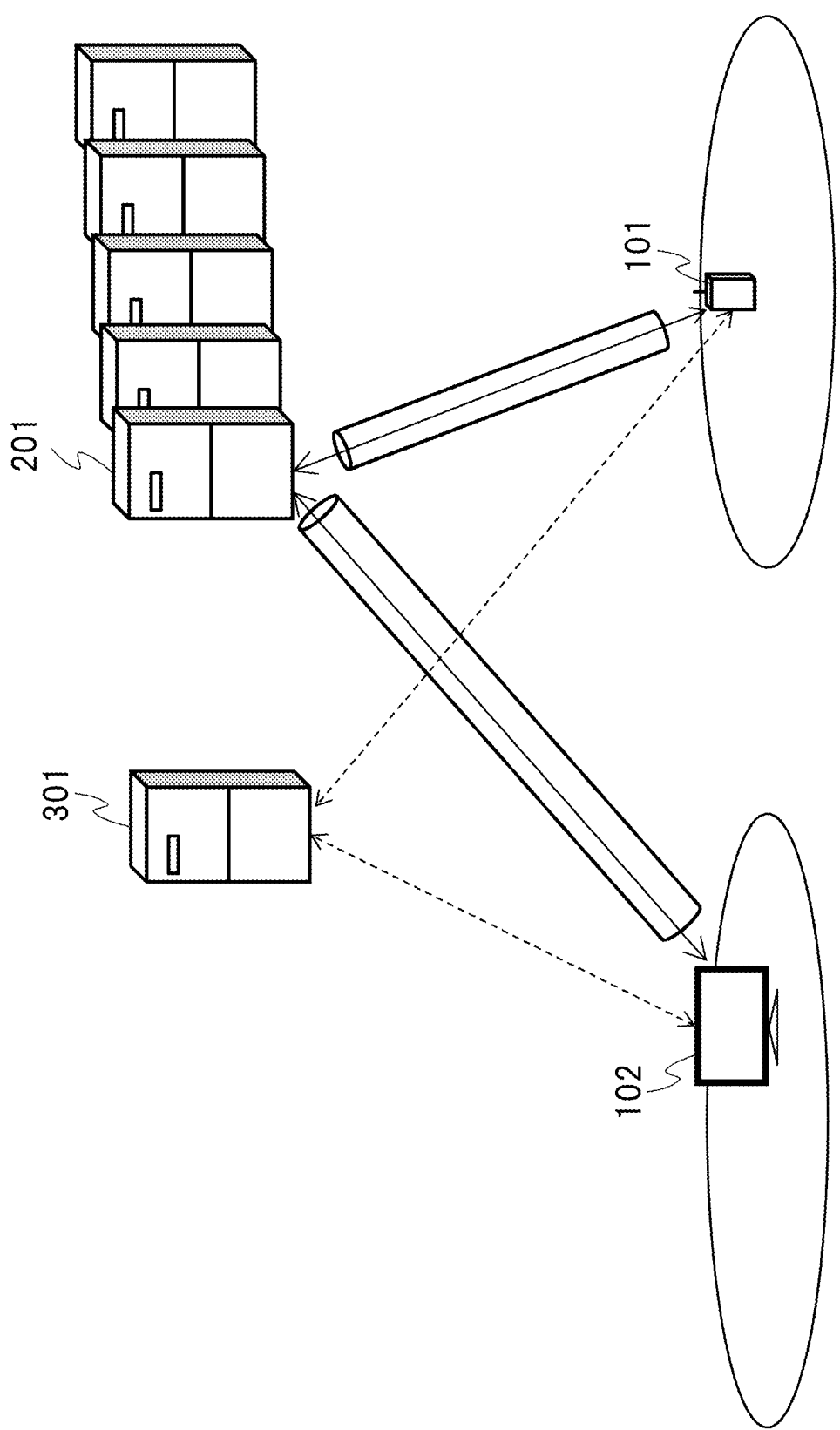
FIG. 1 is a diagram showing an example of a communication environment in the present embodiment.

FIG. 1 is a diagram showing an example of a communication environment in the present embodiment.

A control terminal (control device) 101 is a client terminal, such as a smartphone and a notebook PC, that remotely controls a controlled terminal (communication device) 102. The controlled terminal 102 is a client terminal, such as a home appliance and a PC, that is remotely controlled by the control terminal 101. The control terminal 101 and the controlled terminal 102 exist in different communication networks, and communication between the control terminal 101 and the controlled terminal 102 is performed via a relay server 201 such as a WebSocket server.

The relay server 201, when being connected to the control terminal 101 and the controlled terminal 102 by WebSockets, transfers data received from the control terminal 101 or the controlled terminal 102 to the other WebSocket connection. The relay server 201 serves as a relay server by holding both the WebSocket connections to the control terminal 101 and the controlled terminal 102.

WebSocket is a communications protocol defined by RFC6455 standard, which allows for establishing a permanent connection between a communication source and a communication destination. To cause the controlled terminal 102 to be remotely controlled, the controlled terminal 102 needs to maintain a connection to the relay server 201 until a command is received from the control terminal 101. Therefore, WebSocket is therefore suitable, with which a connection is not disconnected even when a certain amount of time elapses. Note that communications protocols other than WebSocket may be used as long as they can relay data.

A connection control server 301 functions as a connection control device between the control terminal 101 and the controlled terminal 102. The connection control server 301 determines the relay server 201 that establishes communication between the control terminal 101 and the controlled terminal 102. If there are a plurality of relay servers 201, the control terminal 101 and the controlled terminal 102 need to be connected to the same relay server 201. Thus, the control terminal 101 and the controlled terminal 102 need to communicate with the connection control server 301 before being connected to the relay server 201 to receive an instruction on the relay server to be connected.

The present embodiment is to implement the communication between the control terminal 101 and the controlled terminal 102 under such a communication environment.

Figure 2:
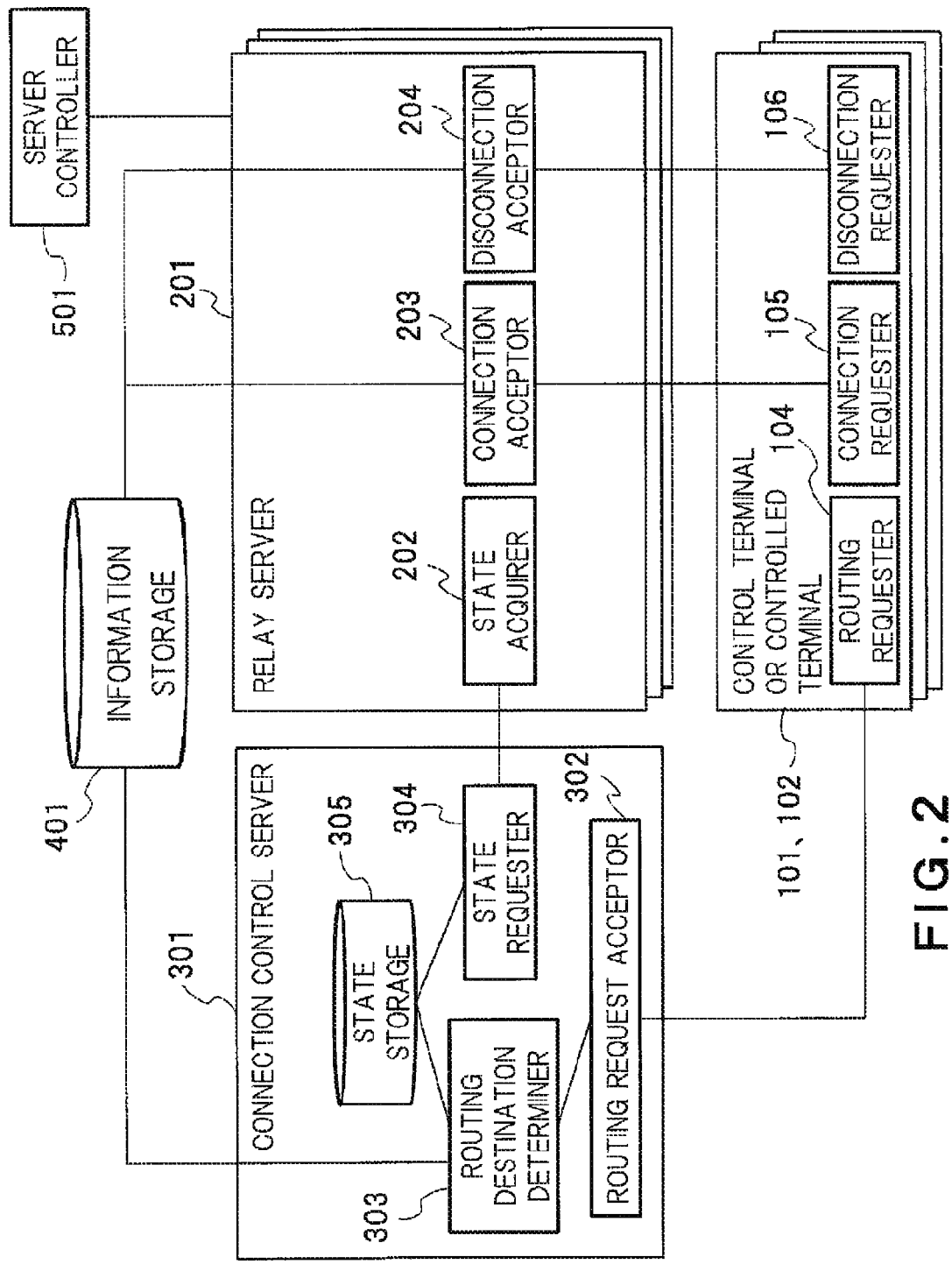
FIG. 2 is a block diagram of a connection control system in the present embodiment.

FIG. 2 is a block diagram of a connection control system in the present embodiment. The connection control system in the present embodiment includes the control terminal 101, the controlled terminal 102, the relay server 201, the connection control server 301, an information storage 401, and a server controller 501. Each element 104, 105, 106 of the control terminal 101 or 102 can be implemented by circuitry, respectively. The circuitry may include a circuit, a plurality of circuits or a system of circuits. Each element is may be different physical circuitry or all or a part of them may be same physical circuitry. Each element 202, 203, 204 of the relay server 201 can be implemented by circuitry, respectively. The circuitry may include a circuit, a plurality of circuits or a system of circuits. Each element is may be different physical circuitry or all or a part of them may be same physical circuitry. Each element 302, 303, 304, 305 of the connection control server 301 can be implemented by circuitry, respectively. The circuitry may include a circuit, a plurality of circuits or a system of circuits. Each element is may be different physical circuitry or all or a part of them may be same physical circuitry. The server controller 501 can be implemented by circuitry, respectively. The circuitry may include a circuit, a plurality of circuits or a system of circuits. Each element is may be different physical circuitry or all or a part of them may be same physical circuitry.

There are a plurality of control terminals 101 and controlled terminals 102, both of them are connected to the relay server 201 that is determined by the connection control server 301. The control terminals 101 and the controlled terminals 102 each include a routing requester (connection destination determination requester) 104, a connection requester 105, and a disconnection requester 106, and each make a routing request of the relay server 201 being a connection destination to the connection control server 301. In addition, The control terminals 101 and the controlled terminals 102 each make a connecting request and a disconnecting request of the connection to the relay server 201 determined by the connection control server 301.

The routing requester 104 transmits to the connection control server 301 a routing request of the relay server 201 to be connected and receives information containing the server ID of relay server 201 that is determined by connection control server 301, as a response.

The connection requester 105 transmits a WebSocket connecting request to the relay server 201 having the server ID based on the server ID acquired from the connection control server 301.

The disconnection requester 106 transmits a WebSocket disconnecting request to the relay server 201 being in connection.

There are a number N of relay servers 201 to distribute WebSocket connections from a large number of control terminals 101 and controlled terminals 102, where N is an integer of two or more. Note that the number of running relay servers may be allowed to become one by one or more relay servers stopping running temporarily. The plurality of relay servers 201 each have a specific identifier (server ID). The relay server 201 includes a state acquirer 202, a connection acceptor 203, and a disconnection acceptor 204.

The state acquirer 202 acquires the usage status of the relay server 201, the number of the control terminals 101 and the controlled terminals 102 being in connection or the number of WebSocket connections, and state information such as a schedule. FIG. 3 is a diagram showing an example of the state information acquired by the state acquirer 202. In the case of the state information in FIG. 3, this server holds 10,000 WebSocket connections. In addition, a scheduled stop time point and a scheduled start time point are specified. A server that has a schedule to stop in such a manner is referred to as a temporary server. A server that does not stop but continues running is referred to as a normal server. The number of WebSocket connections may be the number of WebSocket connections to the controlled terminals 102, or may be the sum of the numbers of WebSocket connections with the control terminals 101 and the controlled terminals 102. The present embodiment will be described below assuming the latter case, but assuming the former case causes no problem.

The connection acceptor 203 receives WebSocket connecting requests from the control terminals 101 and establishes connections with WebSocket the controlled terminals 102 according to a procedure defined in RFC6455. In addition, a time point at which the WebSocket connection is established is recorded in the information storage 401. The recording may be performed at the time of the establishment of the WebSocket connection, or at the time when a certain amount of time elapses therefrom.

The disconnection acceptor 103 receives WebSocket disconnecting requests from the control terminals 101 and the controlled terminals 102, and disconnects WebSocket connections according to a procedure defined in RFC6455. In addition, a time point at which the WebSocket connection is disconnected is recorded in the information storage 401. The recording may be performed at the time of the disconnection of the WebSocket connection, or at the time when a certain amount of time elapses therefrom.

The connection control server 301 may be one or more. In the case of a plurality of the connection control servers 301, there may be a risk that an appropriate relay server 201 cannot be determined when the control terminal 101 or the controlled terminal 102 transmits a routing request to a different connection control server because the connection control server does not hold information on the other connection, but a database or the information storage 401 may be made to be shared by connection control servers such that all the servers can refer to information on the connections. The connection control server 301 may be a server, such as an HTTP server, that can respond routing requests from the control terminals 101 and the controlled terminals 102. The connection control server 301 includes a routing request acceptor (request acceptor) 302, a routing destination determiner (determiner) 303, a state requester 304, and a state storage 305.

The routing request acceptor 302 makes a determination request of a server to be a connection destination to the routing destination determiner 303, in response to routing requests from the control terminals 101 and the controlled terminals 102. Then, the routing request acceptor 302 notifies the control terminals 101 and the controlled terminals 102 of a server ID transmitted from the routing destination determiner 303.

The routing destination determiner 303 determines the relay server 201 to be a connection destination from among the number N of relay servers 201 and transmits the server ID of the server to the routing request acceptor 302. If a request is from a control terminal 101 and a controlled terminal 102 has already been connected to the relay server 201, the relay server 201 is determined to be a connection destination. If a request is from the controlled terminal 102, a connection destination is determined under a communication control rule for avoiding the concentration of reconnecting requests to a normal server when the temporary server stops. For example, a conceivable rule is that a new connection is not routed to a temporary server if a time point at which the temporary server stops approaches. Note that if a request is from the control terminal 101 and the controlled terminal 102 is not connected to any relay server, an error notification may be transmitted to the control terminal 101 as a response.

The state requester 304 transmits an acquiring request of state information to the state acquirer 202 of the relay server 201. In addition, the state requester 304 records in the state storage 305 the state information transmitted from the state acquirer 202 that has received the request.

In the state storage 305, the state information acquired from the relay server 201 is stored. FIG. 4 is a diagram showing an example of the state information stored in the state storage 305. In the case of the state information in FIG. 4, a server having a server ID 01 is a normal server because it has no scheduled stop time point nor scheduled start time point, and a server having a server ID 02 is a temporary server because it has a scheduled stop time point and a scheduled start time point. In this case, after the server having the server ID 02 stops at the stop time point, only one server having the server ID 01 runs. After the scheduled start time point, the server having the server ID 02 returns, and the two servers run. The state information in FIG. 4 contains static information on the servers such as server IDs and IP addresses. These pieces of static information on the servers that are not contained in the state information in FIG. 3 may be separately obtained by the state acquirer 202 and may be associated with the state information in FIG. 3 and transmitted when the state information in FIG. 3 is obtained or transmitted. Alternatively, the state storage 305 may hold the pieces of static information on the servers that are not contained in the state information in FIG. 3, and the pieces of static information may be stored being associating with the received the state information in FIG. 3.

The information storage 401 is a part to store information on connection duration or connection frequencies between the controlled terminals 102 and the relay server 201. For example, the history of connection durations (connection time period history) for each controlled terminal 102 is included. In addition, history information based on connection durations or connection frequencies with the controlled terminals 102 for each server, e.g., information on an average connection duration, a connection occurrence frequency, or the like (hereafter, referred to as connection statistical information) is included. In the information storage 401, similar information on the control terminals 101 may be stored.

The connection duration means a time period from the establishment of a WebSocket connection between a controlled terminal 102 and a relay server 201 until the disconnection of the WebSocket connection. A connection state is continued (maintained) from the establishment of the connection until the completion of the disconnection. FIG. 5 is a diagram showing an example of connection time period histories for each controlled terminal 102 stored in the information storage 401. In the information storage 401, a history of the last five connection durations is stored for each terminal ID of the controlled terminal 102. For example, the history shown in FIG. 5 is recorded in the case where the main power supply of the controlled terminal 102 is turned ON manually or by a setting of a timer or the like and thereafter turned OFF in a similar manner. Alternatively, for a controlled terminal 102 that runs 24 hours a day every day, the connection duration may be recorded as 1440 minutes, which means the whole day. In the present embodiment, it is assumed that the number of history items to be held is five, but the number may be smaller or larger than five. Alternatively, a connection duration shorter than a certain amount of time may be excluded as an irregular connection duration, and only the last five connection durations satisfying the given condition may be recorded.

FIG. 6 is a diagram showing an example of pieces of connection statistical information for each server that is stored in the information storage 401. Pieces of information such as an occurrence frequency at which a relay server 201 receives connecting requests per unit time and an average connection duration that is an average value of the durations of the connections are stored for each server ID. In addition, the connection statistical information may be categorized by time period such as daytime period, nighttime period, and all day period. The object of the information in FIG. 6 may be only the controlled terminal 102 or both the controlled terminal 102 and the control terminal 101.

The calculation of the connection statistical information may be performed by the information storage 401 that receives the connection establishing time point and the connection disconnecting time point, or the connection acceptor 203 and the disconnection acceptor 103 may calculate and transmit the information. In addition, values such as the connection occurrence frequency and the average connection duration may be not only average values for all the controlled terminal 102 but also separated for each controlled terminal 102. In addition, the controlled terminals 102 may be further categorized by their attributes or types, and the values may be stored in the information storage 401 for each category. For example, the controlled terminals 102 can be categorized by types such as a home appliance, facilities, illumination equipment, air-conditioning equipment, and visual equipment, communication networks in which the controlled terminals 102 exist, or time periods or dates of the connections. Values taken by the connection durations may vary in characteristic by the types or the operation statuses of the controlled terminals, and thus using the value for each detailed type or status enables enhanced precision of a conditional expression used for routing destination determination processing to be described hereafter or an estimated connection end time point to be calculated.

The server controller 501 increases or decreases the number of running relay servers 201. Increasing or decreasing the number of running relay servers 201 is to stop or start a temporary server, add a new temporary server, and the like. A timing of increasing or decreasing the number of running relay servers 201 may be a predetermined time point (the above-mentioned scheduled start time point or scheduled stop time point), or may be controlled according to conditions such as the total number of connections, the connecting request occurrence rate, and the load status of the relay server 201, with the relay server 201 monitored.

Next, there will be described processing performed by the connection control system in the present embodiment. The connection control system in the present embodiment has connection and disconnection processing between the relay server 201 and the control terminal 101 or the controlled terminal 102, and update processing of the state information, and routing destination determination processing.

Figure 7:
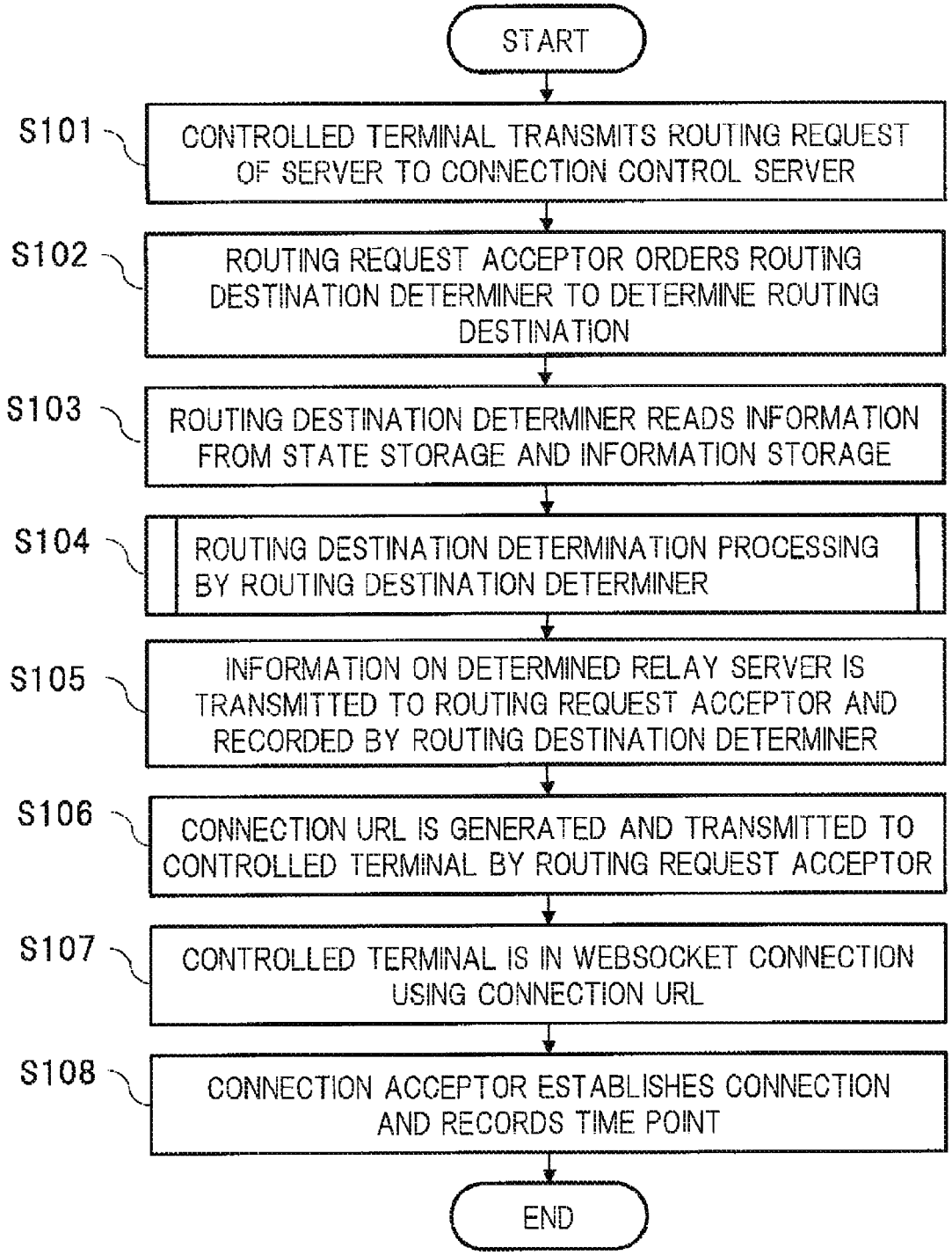
FIG. 7 is a flow chart of connection processing started by the controlled terminal, in the present embodiment.

First, the connection processing started from the controlled terminal 102 will be described. FIG. 7 is a flow chart of the connection processing started from the controlled terminal 102.

The controlled terminal 102 starts processing to establish a WebSocket connection with a timing, for example, when the power supply of device is turned on or when a certain amount of time elapses from the disconnection of a WebSocket connection. The controlled terminal 102 makes a routing request of a server being a connection destination to the connection control server 301 (S101). This acquiring request may be, as an example, an HTTP request or the like. The routing request contains the terminal ID of the controlled terminal 102.

When receiving an acquiring request, the routing request acceptor 302 orders the routing destination determiner 303 to determine a relay server 201 with which the controlled terminal 102 should establish a connection (S102).

The routing destination determiner 303, upon receiving the order of determining a relay server 201, reads state information stored in the state storage 305 and connection time period information stored in the information storage 401 (S103). The routing destination determiner 303 determines a relay server 201 with which the controlled terminal 102 should establish a WebSocket connection based on the read state information and connection time period information (S104). This processing will be described in detail as routing destination determination processing.

The routing destination determiner 303 transmits the server ID and the IP address of the determined relay server 201 to the routing request acceptor 301 (S105). The IP address may be stored in the state storage 305 being associated with the server ID, or may be held by the routing destination determiner 303. The routing destination determiner 303 records a pair of the terminal ID and the server ID of the controlled terminal 102 as corresponding data. The recording destination may be the routing destination determiner 303, the state storage 304, or the others.

The routing request acceptor 302 generates a URL from the IP address of the relay server 201 being a connection destination and the terminal ID of the controlled terminal 102, and transmits the URL to the controlled terminal 102 (S106). More specifically, the routing request acceptor 302 transmits the URL as an HTTP response containing the generated URL. If the IP address of the relay server 201 being a connection destination is "192.168.0.1," and the terminal ID of the controlled terminal 102 is "002," the URL is generated like "ws://192.168.0.1/connect?src=002." The controlled terminal 102 receiving the URL transmits a WebSocket connecting request to the specified URL (S107).

The connection acceptor 203 of the relay server 201 receives the WebSocket connecting request from the controlled terminal 102, establishes a connection, and records the time point of the connection establishment (S108). This connection establishment time point may be held by the connection acceptor 203 or may be recorded in the information storage 401.

The connection processing started from the controlled terminal 102 is thus finished. After the completion of the connection establishment, the controlled terminal 102 maintains the connection with the relay server 201.

Figure 8:
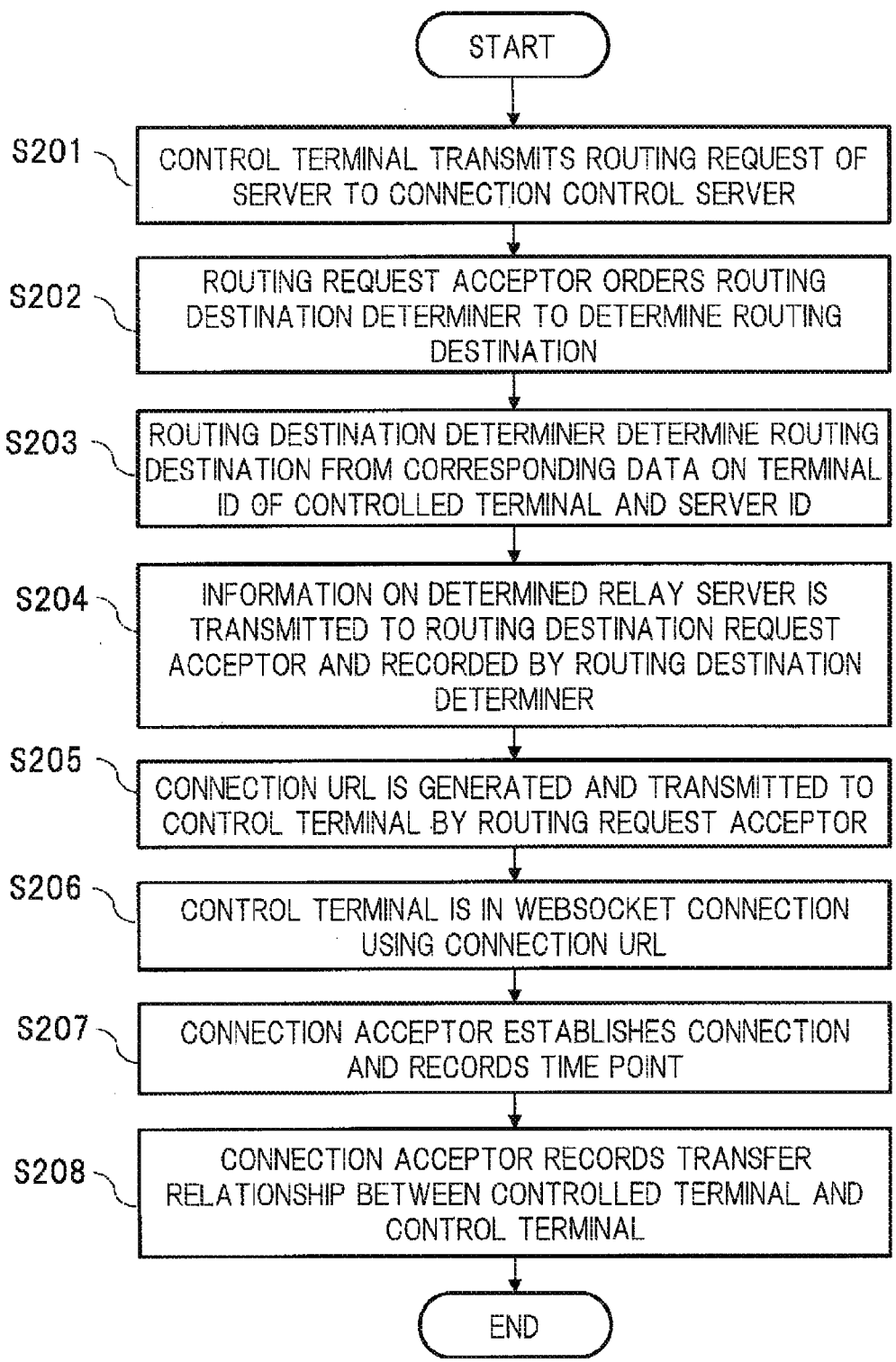
FIG. 8 is a flow chart of connection processing started from a control terminal, in the present embodiment.

Next, there will be described connection processing started from the control terminal 101. FIG. 8 is a flow chart of the connection processing started from the control terminal 101. Note that the description of this flow chart assumes that the controlled terminal 102 is connected to the relay server 201 in advance. If the controlled terminal 102 that the control terminal 101 specifies as a control object is not connected to the relay server 201, an error notification may be transmitted as a response in the routing destination determination processing to be described hereafter. Alternatively, the reconnection processing may be requested to the control terminal 101, or one relay server 201 to be a connection destination may be determined by any method (the same method as the routing destination determination processing in the present embodiment may be used).

The control terminal 101 starts processing for remote control with any timing through an operation on a user interface or the like by a user. First, the control terminal 101 makes a routing request of a connection destination server to the connection control server 301 (S201). This routing request may be an HTTP request or the like. This request contains the terminal ID of the controlled terminal 102 (002). More specifically, "002" is to be contained in a query string being a portion subsequent to "?" that is written in the rear part of a URL.

The routing request acceptor 302 of the connection control server 301, when receiving the routing request, transmits the terminal ID of the controlled terminal 102 contained in the request or the like to the routing destination determiner 303 to order the routing destination determiner 303 to determine a relay server 201 with which the control terminal 101 should establish a connection (S202).

The routing destination determiner 303, upon receiving the order of determining a relay server 201, determines a relay server 201 with which the control terminal 101 should establish a WebSocket connection based on the corresponding data on the terminal ID of the controlled terminal and the server ID (S203).

The routing destination determiner 303, as with the connection processing started from the controlled terminal 102, transmits the server ID and the IP address of the determined relay server 201 to the routing request acceptor 201 (S204). The IP address may be stored in the state storage 305 being associated with the server ID or may be held by the routing destination determiner 303. The routing destination determiner 303 records a pair of the terminal ID and the server ID of the control terminal 101 as corresponding data. The destination of this recording may be the routing destination determiner 303, the state storage 304, or the others.

The routing request acceptor 302 generates a URL from the IP address of the relay server 201 being a connection destination, the terminal ID of the control terminal 101, and the terminal ID of the controlled terminal 102, and transmits the URL to the control terminal 101 (S205). More specifically, the routing request acceptor 302 transmits the URL as an HTTP response containing the generated URL. If the IP address of the relay server 201 being a connection destination is "192.168.0.1," and the terminal ID of the controlled terminal 102 is "002," and the terminal ID of the control terminal 101 is "001," the URL is generated like "ws://192.168.0.1/connect?src=001&dst=002." The parameter name "src" denotes a control terminal, and the parameter name "dst" denotes a controlled terminal. The control terminal 101 receiving the URL transmits a WebSocket connecting request to the specified URL (S206).

The connection acceptor 203 of the relay server 201 receives the WebSocket connecting request, establishes a connection, and records the time point of the connection establishment (S207). This connection establishment time point may be held by the connection acceptor 203 or may be recorded in the information storage 401. Then, the connection acceptor 203 compares the terminal ID of the controlled terminal 102 contained in the URL with the terminal ID of the controlled terminal 102 that is recorded at the time of the connection establishment with the controlled terminal 102, recognizes that the connection at the time of recording this terminal ID is a transfer destination of received data, and records the transfer relationship (S208). The destination of this recording may be the connection acceptor 203, the information storage 401, or the others.

The connection processing started from the control terminal 101 is thus finished. Thereafter, since the relay server 201 grasps the transfer relationship between the controlled terminal and the control terminal, the relay server 201 enables communication between both terminals by transferring information transmitted from the control terminal 101 or the controlled terminal 102 by one WebSocket connection, to the other WebSocket connection. That is, the remote control of the controlled terminal 102 from the control terminal 101 is enabled.

Figure 9:
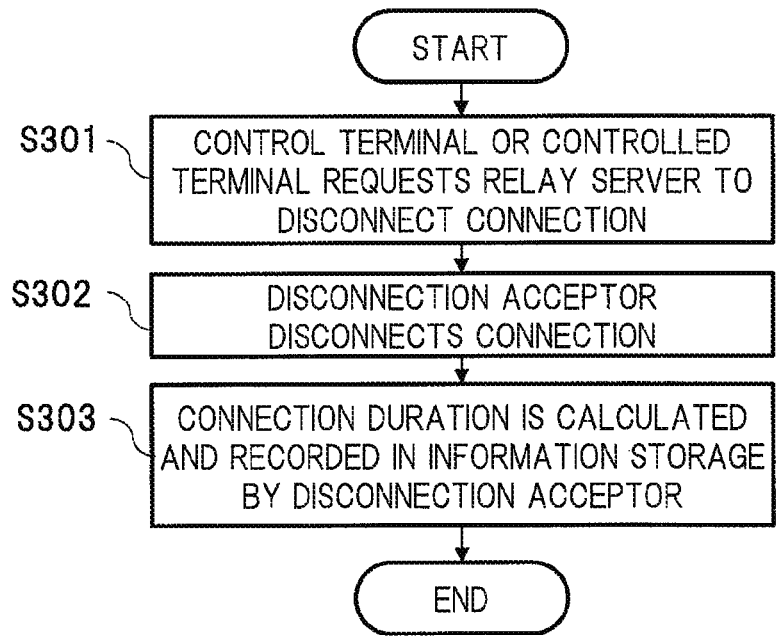
FIG. 9 is a flow chart of disconnection processing in the present embodiment.

Next, disconnection processing will be described. FIG. 9 is a flow chart of the disconnection processing. First, the control terminal 101 or the controlled terminal 102 transmits a disconnecting request of a connection, to the relay server 201 (S301).

The disconnection acceptor 204 receives the disconnecting request of the connection and disconnects the connection (S302). In addition, the disconnection acceptor 204 acquires the time point of a connection establishment from the connection acceptor 203, calculates a connection duration from a difference from a time point of completion of the disconnection, and records the connection duration in the information storage 401, as an entry with the terminal ID of the controlled terminal 102 as a key (S303). For the control terminal 101, a connection duration may be also similarly calculated and recorded. Note that the disconnection acceptor 204 may record the time point of completion of the disconnection in the information storage 401, and the information storage 401 may calculate the connection duration. In the present embodiment, it is assumed that, for at least the controlled terminal 102, the last five history items of connection duration are stored in the information storage 401 for each terminal ID, and thus if a new history item of connection duration is received, the oldest history item may be deleted from the information storage 401 and the newest history item may be stored in the information storage 401. Alternatively, rather than the oldest history item, the most deviating value may be deleted among the past history items and the value of this time.

The disconnection processing is thus finished. According to the disconnection processing in the present embodiment, it is possible to grasp connection durations by recording time points at the completion of the connection processing and at the completion of the disconnection processing.

Figure 10:
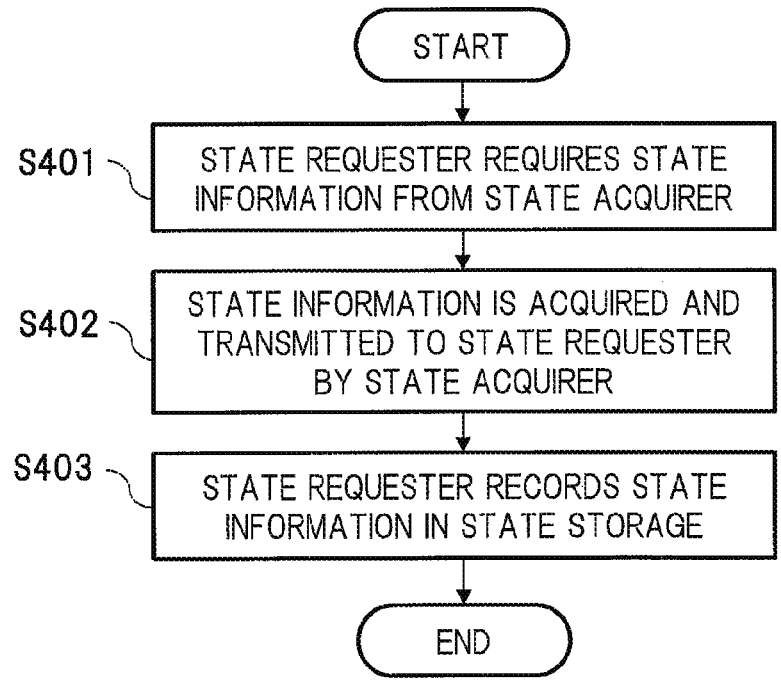
FIG. 10 is a flow chart of update processing of the state information, in the present embodiment.

Next, update processing of state information to be stored in the state storage 305 will be described. FIG. 10 is a flow chart of the update processing of state information.

The state requester 304 makes an acquiring request of state information to the state acquirers 202 of the relay servers 201 (S401). Although there are a plurality of relay servers 201, the request may be simultaneously made to all the servers or may be made individually. The request may be made with any timing. A conceivable method is to transmit the acquiring request as an HTTP request or an SNMP command, but any method can be used as long as the state information shown in FIG. 4 can be acquired. In addition, in this example, the state requester actively makes the request, but the state acquirer 202 may spontaneously acquire state information and transmit the state information to the state requester 304. The acquisition and transmission at this point may be made with any timing.

The state acquirer 202, when receiving the acquiring request of state information, acquires the number of current active WebSocket connections with the relay servers 201 and transmits the number to the state requester 304 (S402). A conceivable method is to acquire the number of WebSocket connections using the function of WebSocket or to transmit a command to an OS in the server.

The state requester 304 records the received state information in the state storage 305 (S403). The information to be recorded may be processed or edited by the state acquirer 202. Alternatively, processing and editing may be performed by the state storage 305.

Through the above procedure, the connection control server 301 collects the pieces of state information of the relay servers 201. The routing destination determiner 303 determines the server IDs of the relay servers 201 with which the controlled terminals should establish WebSocket connections, using the pieces of state information of the relay servers 201 and the information in the information storage 401.

Figure 11:
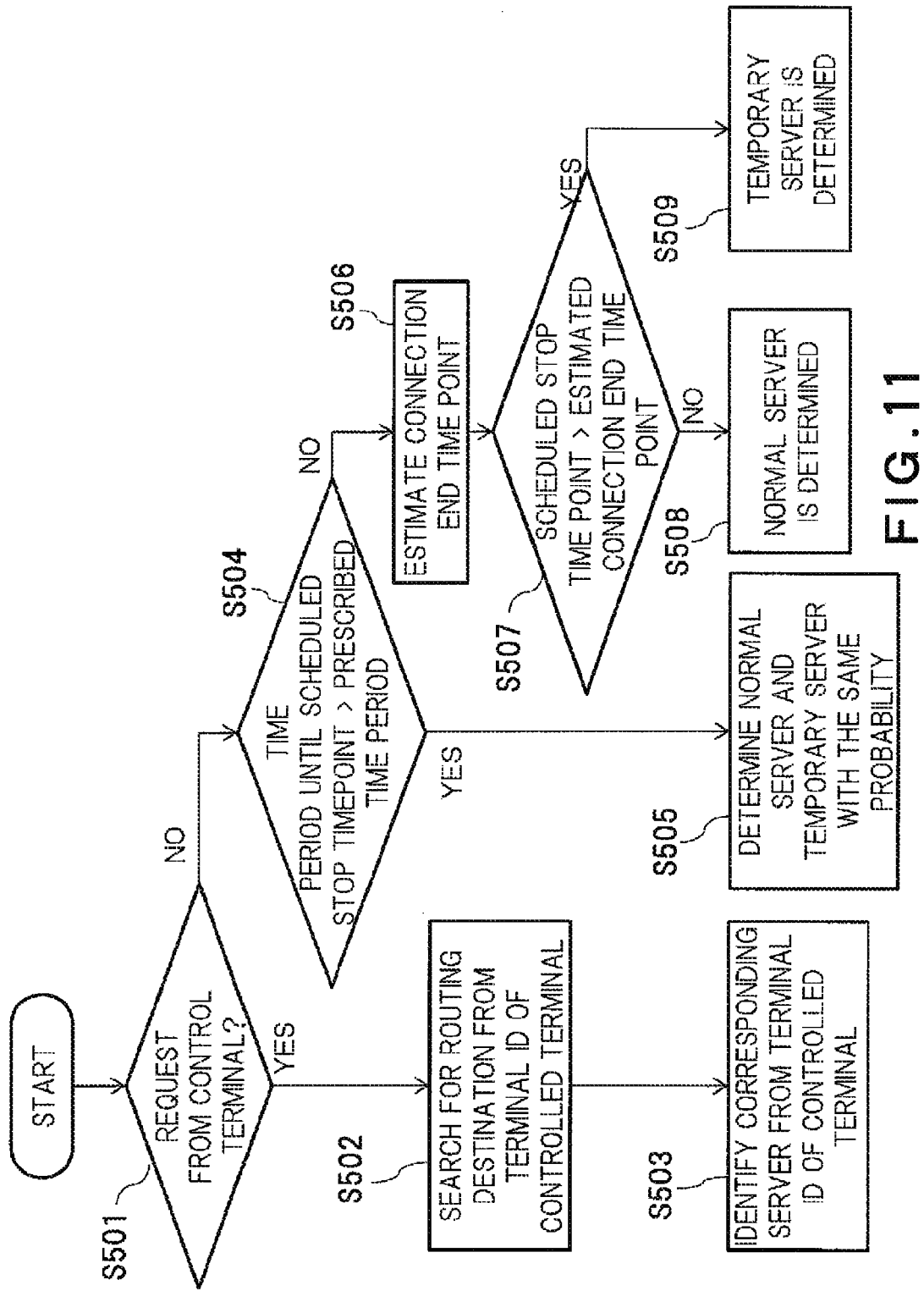
FIG. 11 is a flow chart of routing destination determination processing based on a connection time period history, in the present embodiment.

Next, routing destination determination processing will be described. As an example of the routing destination determination processing, there will be described the case of using a connection time period history, and the case of using a piece of connection statistical information on each server. FIG. 11 is a flow chart of the routing destination determination processing based on a connection time period history.

The routing destination determiner 303 of the connection control server 301 determines whether the received routing request is from the control terminal 101 or the controlled terminal 102 (S501). This determination of whether the routing request is from the control terminal or the controlled terminal may be made from, for example, the header of the HTTP request. Alternatively, it may be determined that the request is from the controlled terminal 102 if the request contains a pair of an identifier indicating a controlled terminal and a terminal ID and does not contain a pair of an identifier indicating a control terminal and a terminal ID, and it may be determined that the request is from the control terminal 101 if the request contains both pairs. Alternatively, a list of the terminal IDs of the control terminals 101 and the controlled terminals 102 may be held in advance, and the determination may be made from the terminal ID and the list if the routing request contains a single terminal ID.

If the request is from the control terminal 101 (YES in S501), data recorded at the time of the connection (corresponding data on the terminals ID and the servers ID of the controlled terminal) is searched for the server ID of the relay server 201 being a connection destination based on the terminal ID of the controlled terminal 102 contained in the request (S502). Then, the server having the identified server ID is determined to be the relay server 201 to be the connection destination (S503). Note that if the server ID cannot be identified owing to the controlled terminal 102 not being connected, an error may be transmitted to the control terminal 101 as a response, a request of reconnection processing made be made after a certain amount of time, or the relay server 201 to be a connection destination may be determined through the same flow as processing of a request from the controlled terminal 102 to be described hereafter (NO in S501).

In contrast, if the received routing request is a request from the controlled terminal 102 (NO in S501), a connection destination is determined under a communication control rule. For example, a conceivable rule is to reduce a frequency at which a new connection to be routed is routed to a temporary server, as a time point at which the temporary server stops approaches. In addition, such a rule that distributes a load such as a CPU usage or the number of connections of the relay server 201 may be added. In this flow chart, a connection destination is determined in such a manner that reduces the number of connections of a temporary server if a time point at which the temporary server stops is within a predetermined time period or that distributes the load if the time point is beyond the predetermined time period.

It is determined whether a time period until the scheduled stop time point of the temporary server is beyond predetermined time period (S504). If the time period until the scheduled stop time point is beyond the predetermined time period (YES in S504), which means that there are a few needs to start the limitation of connections to the temporary server, the routing destination determiner 303 selects a normal server or a temporary server with the same frequency (e.g., the same probability) and determines the selected server as a server to be connected (S505). This predetermined time period may be a certain predetermined amount of time or may be determined from the current connection status. For example, if the current number of connections or a connection occurrence frequency exceeds a predetermined threshold value, it is conceivable to shorten the predetermined time period so as to cause the limitation of connections to the temporary server to be started earlier. In addition, the probability of the selection may be varied. For example, the probability may be varied in accordance with the capability (e.g., maximum number of available connections) of a server and may be increased for a server having a higher capability.

In contrast, if the time period until the scheduled stop time point of the temporary server is within the predetermined time period (NO in S504), the routing destination determiner 303 acquires the history of connection duration from the connection time period information stored in the information storage 401 and estimate a time point at which the connection is ended (estimated connection end time point) (S506). This estimating method is performed in such a manner that determines the estimated connection end time point to be a time point after the same time period as the previous connection duration elapses from a connection start time point, that determines the estimated connection end time point to be a time point after a time period of the average value of connection histories elapses, or that determines the estimated connection end time point to be a time point after the same time period of the average of connection durations of the other controlled terminal 102 (or the other control terminal 101) in the same time period elapses. Alternatively, the average connection duration of the temporary server may be used.

The routing destination determiner 303 compares the estimated connection end time point with the scheduled stop time point. If the scheduled stop time point is earlier than the estimated connection end time point (NO in S507), that is, the estimated connection end time point minus the scheduled stop time point is greater than zero, the routing destination determiner 303 selects a normal server (S508). If the scheduled stop time point is later than the estimated connection end time point (YES in S507), that is, the estimated connection end time point minus the scheduled stop time point is less than zero, the routing destination determiner 303 gives an instruction of a connection with a temporary server (S509). More generally, it can be said that, if the estimated connection end time point minus the scheduled stop time point is greater than a threshold value, the selection frequency of a temporary server is decreased (e.g., a normal server is selected in a fixed manner), or if the estimated connection end time point minus the scheduled stop time point is less than the threshold value, a temporary server is selected.

As described above, according to the present embodiment, it is possible to properly determine the connection destination of a controlled terminal by the routing destination determination processing based on the connection time period history, in accordance with the running stop schedule and the running start schedule of a relay server. For example, by selecting a normal server for a controlled terminal the connection of which is likely to be maintained also after the scheduled stop time point of a temporary server, it is possible to reduce the number of connections of the temporary server at the scheduled stop time point of the temporary server. In contrast, by causing a controlled terminal the connection of which is likely to be disconnected earlier than the scheduled stop time point to be connected to a temporary server, it is possible to avoid the concentration of the number of connections to a normal server.

Next, the routing destination determination processing will be described based on connection statistical information for each server. This example is a method to determine a connection destination for the purpose of controlling the number of connections to be forcibly disconnected at the time of the stop of the temporary server within an allowable number.

Figure 12:
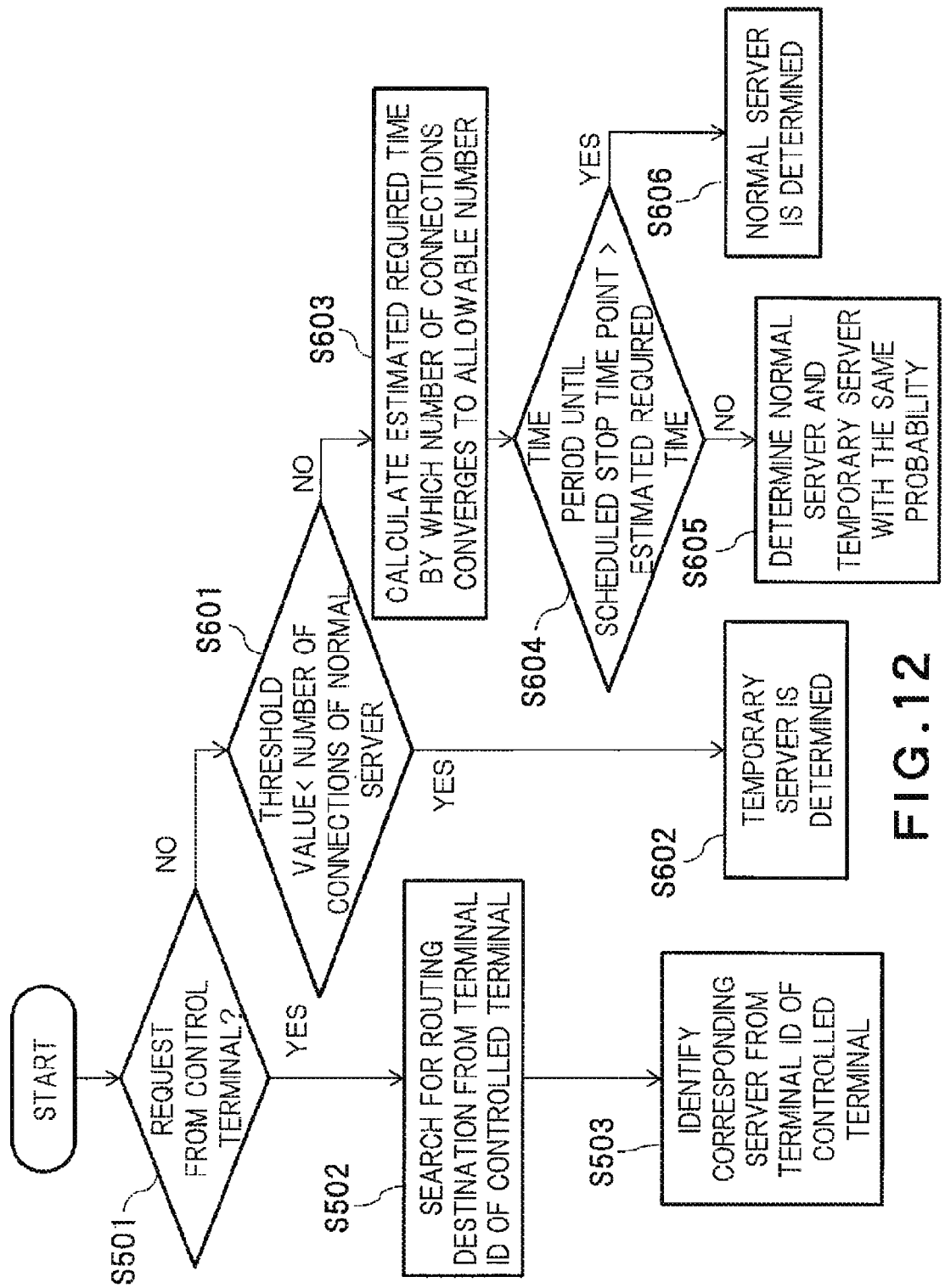
FIG. 12 is a flow chart of routing destination determination processing based on connection statistical information in the present embodiment.

FIG. 12 is a flow chart of the routing destination determination processing based on connection statistical information. The determination of whether a routing request received by the routing destination determiner 303 is from the control terminal 101 and the controlled terminal 102 is similar to that in the processing using the connection time period history.

If the routing destination determiner 303 determines that the request is from the controlled terminal 102 (NO in S501), the routing destination determiner 303 determines whether a number CO1 of connections of a normal server exceeds a predetermined threshold value from the state information (S601), and if the number CO1 exceeds the threshold value (YES in S601), a temporary server is selected as a server to be connected (S602). This threshold value is assumed to be determined taking the capability and the load of a server into consideration, but the threshold value may be determined in accordance with the other criteria.

If the number CO1 does not exceed the threshold value (NO in S601), the routing destination determiner 303 determines a connection destination such that the temporary server does not hold the number of connections of the allowable number or more at the time of forced disconnection while distributing the number of connections as equally as possible. For example, according to the approximation in which the arrival rate of connecting requests follows the Poisson distribution, and connection durations follows the exponential distribution, assuming that no connection is to be routed to the temporary server from now on, an estimated required time T taken for a current number CO2 of connections of the temporary server to become equal to an allowable number R is calculated by the following expression, with λ denoting the average connection duration (S603).

$$T = \lambda \times \ln\left(\frac{CO2}{R}\right) \qquad \text{[Expression 1]}$$

For example, when the average connection duration λ=120 (minutes), the current number of connections CO2=43000, and the disconnection allowable number R=8000, the estimated required time T=120×ln(43000/8000)≈202 (minutes). The allowable number R may be held in advance by the routing destination determiner 303, or may be held by the information storage 401 and acquired at the time of acquiring the connection statistical information.

The routing destination determiner 303 compares a time period until the scheduled stop time point with the estimated required time T, and if the estimated required time T is greater than the time period (NO in S604), which means that there are a few needs to start the limitation of connection to a temporary server, the routing destination determiner 303 selects a normal server and a temporary server with the same probability (S605). Note that the probability of the selection may be varied similarly to the above-described manner. If the estimated required time is less than the time period (YES in S604), a normal server is selected (S606). More in general, it can be said that, if the time period until the scheduled stop time point minus the estimated required time T is less than or equal to a threshold value, a normal server and a temporary server are selected with predetermined probabilities, respectively (e.g., the same probability), or if the time period minus the estimated required time T is greater than the threshold value, the selection frequency of a temporary server is decreased (e.g., a normal server is selected in a fixed manner).

As described above, according to the present embodiment, by the routing destination determination processing based on the connection statistical information, it is possible to route connection destinations such that the number of connections of a temporary server at the stop time point does not exceed the allowable number R by using prediction by the approximate expression. Therefore, by varying the allowable number R, it is possible to control the number of occurrences of reconnections with the stop of a temporary server to a desired value. In addition, if the time period until the scheduled stop time point is longer than the estimated required time T, it is possible to avoid making the number of connections to a normal server excessive by performing the routing to both servers with the same probability.

Figure 13:
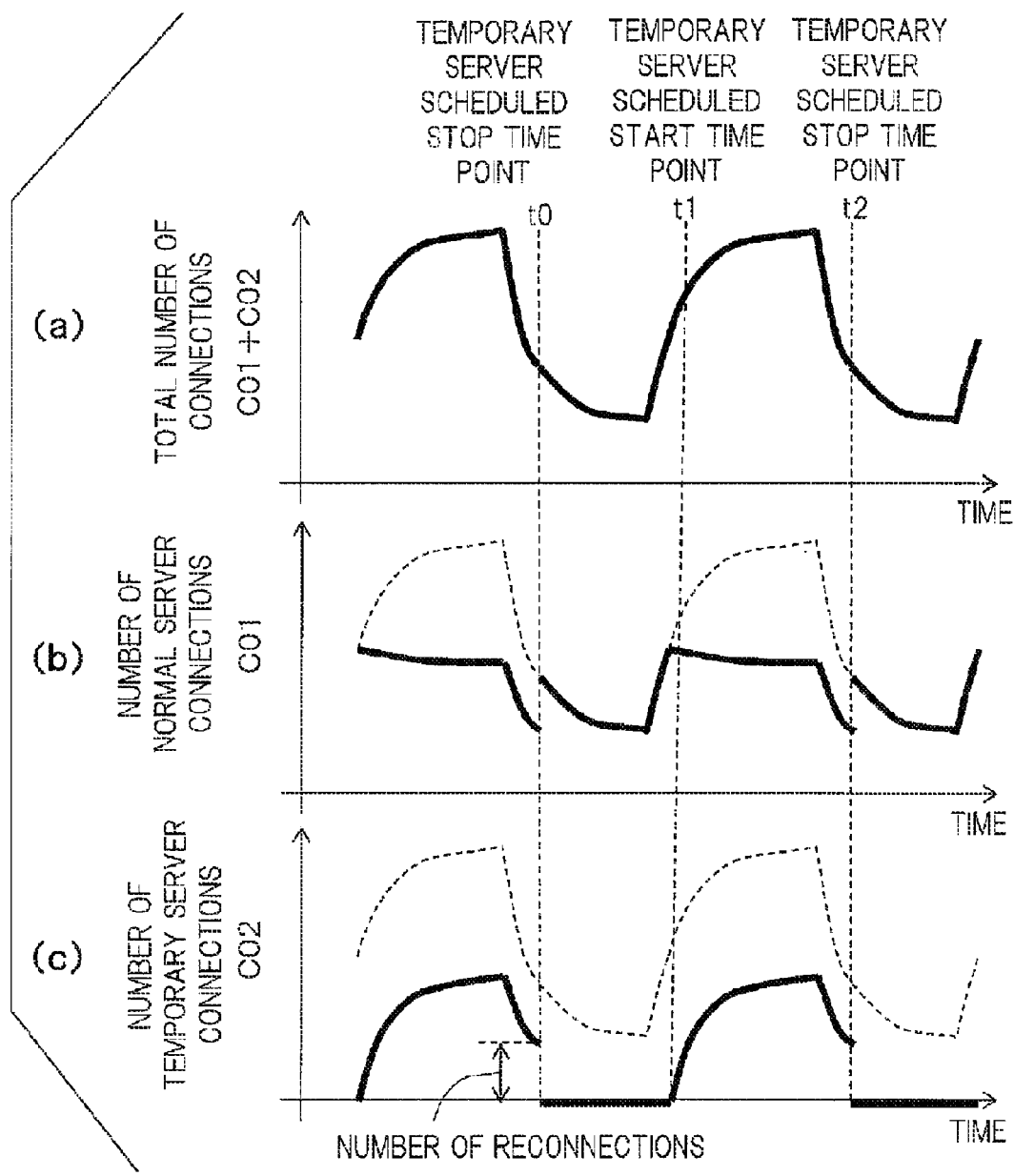
FIG. 13 is a transition diagram of the number of server connections in the case where servers to be connected are routed with the same probability, in the present embodiment.
Figure 14:
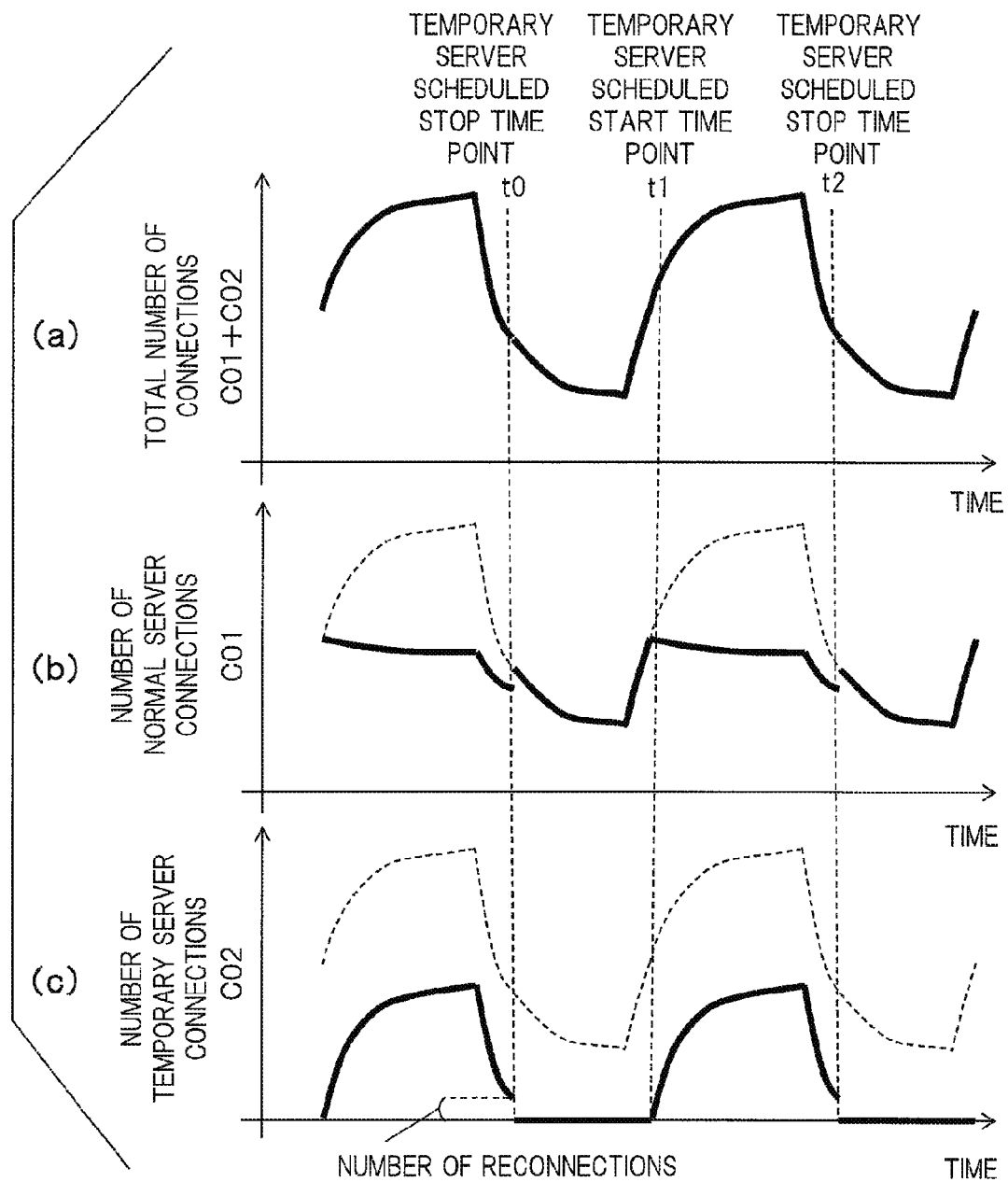
FIG. 14 is a transition diagram of the time period and the number of server connections in the case where routing destination determination processing is performed, in the present embodiment.

FIG. 13 is a transition diagram of the number of server connections in the case where the connections of the controlled terminals 102 are routed to two relay servers 201 with the same probability. In addition, FIG. 14 is a transition diagram of the number of server connections in the case where this routing destination determination processing is performed on two relay servers 201. FIG. 13(a) and FIG. 14(a) are the transition diagrams of the sum of the number of connections CO1 of a normal server and the number of connections CO2 of a temporary server or the total number of connections of the two servers. FIG. 13(b) and FIG. 14(b) are the transition diagrams of the number of connections CO1 of the normal server, and FIG. 13(c) and FIG. 14(c) are the transition diagrams of the number of connections CO2 of the temporary server. These numbers of connections include the connection of both the control terminals 101 and the controlled terminals 102. The evaluation may be made using only the number of connections of the controlled terminals 102, and this case is also considered to result in a similar trend. In the drawing, a time period of t0<time point≤t1, where the number of connections is in a decreasing trend, is a midnight period, and a time period of t1<time point≤t2, where the number of connections is in an increasing trend, is a daytime period. Thus, the number of connections has a diurnal pattern. In the daytime period, one normal server and one temporary server run, and in the midnight period, the one normal server runs. The temporary server stops at time points t0 and t2, and starts at a time point t1.

In the midnight period, since the number of new connections decreases, and the number of disconnected connections increases, the number of connections of the servers decreases. In FIG. 13, since new connections are routed with the same probability, and the normal server and the temporary server have the same decreasing pitch of the number of connections. In contrast, in FIG. 14, since no new connection is routed to the temporary server, the temporary server has a higher decreasing pitch. For this reason, it can be seen that the number of connections of the temporary server at the time of the stop of the temporary server is smaller in FIG. 14. Therefore, the number of reconnecting requests is also small after the stop of the temporary server.

As described above, according to the present embodiment, it is possible to reduce the number of forced disconnections of WebSocket connections that occurs at the time of the stop of the temporary server, and to prevent a processing load with reconnections to the normal server from being rapidly increased.

Note that, in this example of the routing destination determination processing, the required time until the number of connections of the temporary server becomes equal to the allowable number R is estimated, but the value of the allowable number R may be varied with time. In addition, the allowable number R is determined to be an allowable number at the time of the stop of the temporary server, but is not limited to one at the time of the stop of the temporary server. Such a form may be employed that the number of connections of a temporary server when a time period t (t is any number) elapses from the current time point is estimated by optional means, and processing is switched according to whether the number of connections when the time period t elapses exceeds an allowable number Rt of that time point.

In addition, in this example of the routing destination determination processing, the value of T is estimated based on the approximate expression, but is not limited thereto.

The value of T calculated by an optional method such as simulation may be held in advance by the routing destination determiner 303. In addition, the normal server is selected with a probability of 100% if the time period until the scheduled stop time point is smaller than the value of T (NO in S604), but this probability may be varied.

As an example other than that using the allowable number R, the number of controlled terminals 102 the estimated connection end time points of which are later than a time point at which the time period t elapses from the current time point may be counted among the controlled terminals 102 being connected to the temporary server, and with the count determined as the estimated value of the number of connections, the operation may be switched according to whether this value exceeds a predetermined threshold value. That is, if this value is greater than the threshold value, processing similar to the case where the time period until the above-mentioned scheduled stop time point is less than the value of the estimated required time T may be performed, or if this value is less than or equal to the threshold value, processing similar to the case where the time period until the scheduled stop time point is greater than the estimated required time T may be performed. Note that as an assumption of this case, it is assumed that the information storage 401 stores, in addition to the information shown in FIG. 6 (the connection occurrence frequency and the average connection duration), the history of the last five connection durations for each terminal ID of the controlled terminal (connection time period history) shown in FIG. 5. Furthermore, it is assumed that the information storage 401 stores an estimated connection end time point for each terminal ID of the controlled terminal that is calculated using this history.

Note that, although the present embodiment achieves controlling the number of connections forcibly disconnected by the routing destination determination processing at the time of the stop of the temporary server within the allowable number, but may be combined with the other method of achieving.

For example, the present embodiment may be combined with a method in which the temporary server gradually disconnects the connections on the temporary server before the scheduled stop time point with a frequency to the extent that reconnections are not concentrated. It is thereby possible to further suppress the number of connections of the temporary server at the stop time point, and to prevent a processing load with a large number of reconnections with forced disconnections from being rapidly increased.

In addition, the control terminal 101 and the controlled terminal 102 may perform the reconnection processing after a random wait time, rather than reconnecting immediately after a WebSocket connection is disconnected.

Note that, each processing in the above-described embodiment described above can be implemented by software (a program). Therefore, some parts of the connection control system in the above-described embodiment can be implemented by using, for example, a multi-purpose computer device as basic hardware and causing a processor installed in the computer device to execute the program.

Figure 15:
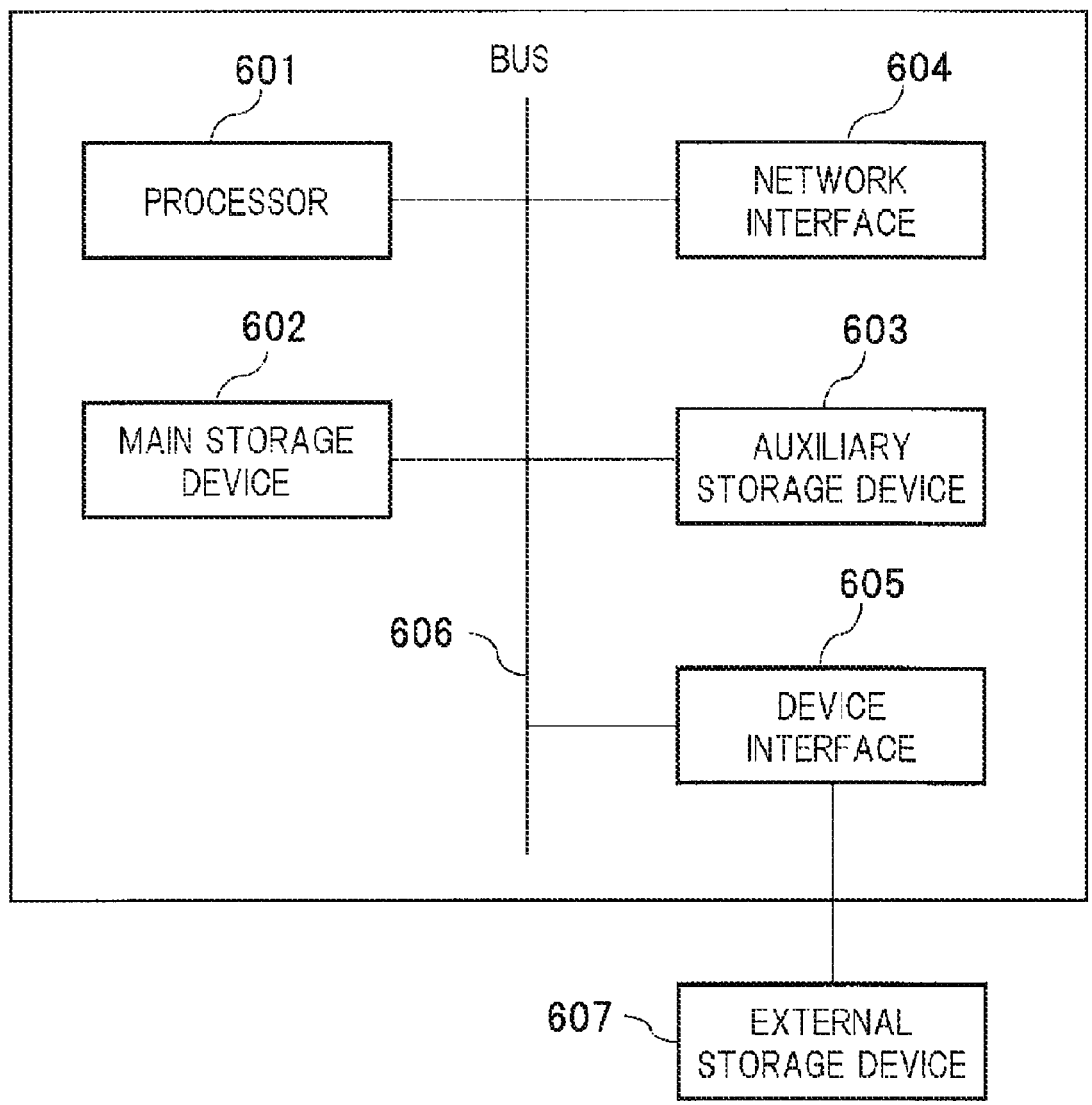
FIG. 15 shows a hardware configuration example of an embodiment in the present embodiment.

FIG. 15 shows a hardware configuration example of the connection control server in the present embodiment. Note that, the relay server 201, the control terminal 101, and the controlled terminal 102 can be implemented by the hardware configuration in FIG. 15.

A connection control device can be implemented as a computer device including a processor 601, a main storage device 602, an auxiliary storage device 603, a network interface 604, and a device interface 605, which are connected to one another via a bus 606.

The functions of the routing request acceptor 302, the routing destination determiner 303, the state requester 304, and the state storage 305 can be implemented by the processor 601 reading a program from the auxiliary storage device 603, and extending and executing the program on the main storage device 602.

The connection control device in the present embodiment may be implemented by installing a program to be executed on the connection control device in the computer device in advance, or may be implemented by installing the program in the computer device suitably, the program being stored in a storage medium such as a CD-ROM or being distributed over a communication network.

The network interface 604 is an interface used to connect to a communication network. The communication with the control terminal 101, the controlled terminal 102, the relay server 201, the information storage 401, the server controller 501, and the like may be implemented by this network interface 604. Although here is shown only one network interface, a plurality of network interfaces may be installed.

The device interface 605 is an interface used to connect to a device such as an external storage device 607. The external storage device 510 may be any recording medium such as an HDD, CD-R, CD-RW, DVD-RAM, DVD-R, and SAN (Storage area network). The information storage 401 may be connected by this device interface 605. In addition, if there are outside a display device such as a display and an input device such as a keyboard, the device interface 605 may be connected to them.

The main storage device 602 is a memory device to temporarily store commands executed by the processor 601, various kinds of data, and the like, and may be a volatile memory such as a DRAM or a nonvolatile memory such as a MRAM. The auxiliary storage device 603 is a storage device to permanently store the program, data, and the like, and is, for example, an HDD, an SSD, or the like. The function of the information storage 401 can be implemented by the main storage device 602, the auxiliary storage device 603, or the external storage device 607.

The terms used in each embodiment should be interpreted broadly. For example, the term "processor" may encompass a general purpose processor, a central processor (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "storage" or "storage device" employed in the embodiments, may encompass any electronic component which can store electronic information. The "storage" or "storage device" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic such as an HDD, an optical disc or SSD.

It can be said that the storage electronically communicates with a processor if the processor read and/or write information for the storage. The storage may be integrated to a processor and also in this case, it can be said that the storage electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A connection control device comprising:
   a first circuit configured to transmit an acquiring request of state information to a plurality of relay servers including a temporary server and a normal server via a network and receive the state information transmitted from the relay servers, wherein the temporary server has a scheduled stop time point and a scheduled start time point set therein and stops running at the scheduled stop time point and restarts the running at the scheduled start time point and the normal server continues running without stopping, the plurality of relay servers being configured to connect between control devices and communication devices controlled by the control devices;
   a second circuit configured to receive a connection destination determination request transmitted from a first of the communication devices which is not yet connected to any relay server, via the network; and
   a third circuit configured to select a relay server to be connected by the first communication device from among the plurality of relay servers based on the state information,
   wherein
   the second circuit is configured to transmit address information of the relay server selected by the third circuit to the first communication device, the address information being required for the first communication device to connect to the selected relay server,
   the third circuit is configured to specify a number of communication devices connected to the normal server based on the state information,
   when the number of connected communication devices is not larger than a threshold value, the third circuit is configured to calculate an estimated required time for a number of communication devices connected to the temporary server to become a predetermined allowable value where an arrival rate of connection requests follows a first distribution and connection times of communication devices follow a second distribution, and select a relay server so that a load is equally distributed between the temporary server and the normal server when the estimated required time is longer than a time period until the scheduled stop time point is reached.

2. The connection control device according to claim 1, wherein the third circuit is configured to select the temporary server when the number of connected communication devices is larger than the threshold value.

3. The connection control device according to claim 2, wherein the third circuit is configured to select the normal server or the temporary server at a same probability when the estimated required time is longer than the time period until the scheduled stop time point is reached.

4. The connection control device according to claim 1, wherein the third circuit is configured to select the normal server when the estimated required time is shorter than the time period until the scheduled stop time point is reached.

5. The connection control device according to claim 1, wherein the first distribution is a Poisson distribution and the second distribution is an exponential distribution.

6. The connection control device according to claim 1, wherein the predetermined allowable value varies with time.

7. The connection control device according to claim 1, wherein the third circuit is configured to select the relay server from among relay servers for which a number of connected communication devices is less than or equal to a threshold value.

8. The connection control device according to claim 1, wherein
   the second circuit is configured to receive a connection destination determination request from a first of the control devices which is not yet connected to any relay server via the network,
   the connection destination determination request from the first control device contains information specifying the first communication device being a control object by the first control device,
   the third circuit is configured to determine connection destination of the first control device by selecting same relay server as the relay server selected for the first communication device, and
   the second circuit is configured to transmit address information of the relay server determined by the third circuit to the control device via the network, the address information being required for the control device to connect to the determined relay server.

9. The connection control device according to claim 1, wherein the third circuit is configured to select a relay device from among relay servers for which a total number of connected communication devices and connected control devices is less than or equal to a threshold value.

10. The connection control device according to claim 1, wherein the third circuit is configured to specify a total number of connected communication devices and connected control devices, and select the temporary server when the total number is larger than a threshold value.

11. The connection control device according to claim 1, wherein the address information of the selected relay device is a URL of the selected relay device.

12. The connection control device according to claim 8, wherein the address information of the determined relay device is a URL of the determined relay device.

13. A non-transitory computer readable medium having a program stored therein which, when executed, causes a computer to execute processing comprising:
   transmitting an acquiring request of state information to a plurality of relay servers including a temporary server and a normal server via a network and receiving the state information transmitted from the relay servers, wherein the temporary server has a scheduled stop time point and a scheduled start time point set therein and stops running at the scheduled stop time point and restarts the running at the scheduled start time point and the normal server continues running without stopping, the plurality of relay servers being configured to connect between control devices and communication devices controlled by the control devices;

receiving a connection destination determination request transmitted from a first of the communication devices which is not yet connected to any relay server, via the network; and selecting a relay server to be connected by the first communication device from among the plurality of relay servers based on the state information, wherein the selecting includes; specifying a number of communication devices connected to the normal server based on the state information; when the number of connected communication devices is not larger than a threshold value, calculating an estimated required time for a number of communication devices connected to the temporary server to become a predetermined allowable value where an arrival rate of connection requests follows a first distribution and connection times of communication devices follow a second distribution; and selecting a relay server so that a load is equally distributed between the temporary server and the normal server when the estimated required time is longer than a time period until the scheduled stop time point is reached.

14. A connection control system comprising a first communication device, a first control device that remotely controls the first communication device, and a connection control device, wherein the connection control device comprises:

a first circuit configured to transmit an acquiring request of state information to a plurality of relay servers including a temporary server and a normal server via a network and receive the state information transmitted from the relay servers, wherein the temporary server has a scheduled stop time point and a scheduled start time point set therein and stops running at the scheduled stop time point and restarts the running at the scheduled start time point and the normal server continues running without stopping, the plurality of relay servers being configured to connect between control devices and communication devices controlled by the control devices, a second circuit configured to receive a connection destination determination request transmitted from a first of the communication devices which is not yet connected to any relay server, via the network; and a third circuit configured to select a relay server to be connected by the first communication device from among the plurality of relay servers based on the state information, the second circuit is configured to transmit address information of the relay server selected by the third circuit, required to connect by the first communication device to the selected relay server via the network, the first communication device is configured to transmit the connection destination determination request to the connection control device and receive the address information of the selected relay device and connects to the relay server identified by the address information, the first control device is configured to transmit a connection destination determination request containing information specifying the first communication device to the connection control device, the third circuit of the connection control device is configured to determine connection destination of the first control device by selecting same relay server as the relay server selected for the first communication device, the second circuit is configured to transmit address information of the relay server determined by the third circuit, required to connect by the first control device to the determined relay server via the network, the first control device is configured to connect to the relay server identified by the address information received from the connection control device, the third circuit is configured to specify a number of communication devices connected to the normal server based on the state information and when the number of connected communication devices is not larger than a threshold value, the third circuit is configured to calculate an estimated required time for a number of communication devices connected to the temporary server to become a predetermined allowable value where an arrival rate of connection requests follows a first distribution and connection times of communication devices follow a second distribution, and select a relay server so that a load is equally distributed between the temporary server and the normal server when the estimated required time is longer than a time period until the scheduled stop time point is reached.

* * * * *